United States Patent [19]

Kwiecinski

[11] 4,362,263
[45] Dec. 7, 1982

[54] SOLDERABLE SOLVENTLESS UV CURABLE ENAMEL

[75] Inventor: James R. Kwiecinski, Wilkins Township, Allegheny County, Pa.

[73] Assignee: Westinghouse Electric Corp., Pittsburgh, Pa.

[21] Appl. No.: 143,203

[22] Filed: Apr. 24, 1980

[51] Int. Cl.$^3$ .................. B05D 3/06; B32B 15/08; H01B 3/40
[52] U.S. Cl. .................. 228/263 A; 174/110 E; 204/159.14; 219/85 M; 219/129; 427/54.1; 427/117; 430/280; 428/379
[58] Field of Search .................. 428/379; 430/280; 219/85 M, 129; 174/110 E; 228/101, 214, 263

[56] References Cited

U.S. PATENT DOCUMENTS 4,000,115 12/1976 Jacobs .
4,086,091 4/1978 Cella .................. 430/280
4,090,936 5/1978 Barton .
4,138,255 2/1979 Crivello .................. 430/280
4,173,476 11/1979 Smith .
4,186,108 1/1980 Carlson .................. 430/280
4,218,531 8/1980 Carlson .................. 430/280
4,256,828 3/1981 Smith .................. 430/280

FOREIGN PATENT DOCUMENTS 2904450 6/1979 Fed. Rep. of Germany .
2904625 7/1979 Fed. Rep. of Germany .

Primary Examiner—James C. Cannon
Attorney, Agent, or Firm—R. D. Fuerle

[57] ABSTRACT

A solderable solventless UV curable enamel is disclosed which comprises a totally saturated compound having at least two rings each containing an epoxy group and a UV curative which generates a cation in the presence of UV light. The enamel contains no Lewis base but may contain up to 35% by weight based on total solids of a modifying resin which is co-reactive with the totally saturated compound and which does not char or prevent UV cure. The enamel is suitable for coating wires which must be soldered because the enamel melts away from the solder instead of charring.

9 Claims, No Drawings

SOLDERABLE SOLVENTLESS UV CURABLE ENAMEL

BACKGROUND OF THE INVENTION

Recent concern about both ecology and energy conservation has prompted interest in ultraviolet (UV) radiation curable resin systems. Wire enamelers in particular have shown great interest in the UV curable systems not only because of the potential of ecological benefits that can be derived but also because of the promise of greatly increased productivity. A UV cured wire enamel is a 100% solids, totally reactive resin that can be applied in a single pass and is cured with energy (UV) that is specific to the resin only. For comparison, a typical thermally cured wire enamel contains approximately 70% solvent which must first be boiled off before the resin can be cured and then must be incinerated to prevent ecological damage. This is costly in terms of wasted energy and large quantities of solvent which are lost and cannot be recovered. Also, thermal energy is non-specific and must heat the wire substrate before the resonant system can begin to fully cure. The enamel must also be applied in multiple passes to achieve good coatings. Thus, the advantages of the UV curable system are obvious.

One specific area of interest is that of a UV curable solderable wire enamel. Initially, it was anticipated that almost any of the commercially available vinyl monomers, suitably modified with a photosensitizer, would provide a wire enamel that would be solderable. This, however, did not prove to be true. The vinyl monomers, when photosensitized, readily polymerized through a free radical mechanism initiated by UV radiation to form films with wire enamel properties. However, these types of wire enamels do not solder even at solder pot temperatures of 400°–500° C. The enamel film doesn't soften and flow, but simply chars, leaving a carbonaceous deposit on the wire which prevents the solder from properly wetting the copper substrate.

SUMMARY OF THE INVENTION

We have discovered an enamel composition containing cycloaliphatic epoxies which is curable with UV radiation and forms a solderable film. That is, when a wire coated with the cured enamel is dipped into a pot of molten solder, the enamel does not char but melts away from the solder leaving a clean copper surface to which the solder readily adheres. It was entirely unexpected and surprising that this wire enamel composition was solderable.

In addition to being solderable, the wire enamels of this invention also produce smooth, flexible films with good adherence at a high coating speed. As with other UV curable enamels, the enamel of this invention uses less energy than thermally cured wire enamels and produces virtually no pollution. The wire can be coated in a single pass so that it is now possible to coat six wires, for example, on a machine in which previously one wire was coated with six passes.

PRIOR ART

U.S. Pat. Nos. 4,000,115, 4,090,936, and 4,173,476 disclose photopolymerizable epoxy resins. German Pat. Nos. 2,904,450 and 2,904,625 also disclose photopolymerizable epoxy resins.

DESCRIPTION OF THE INVENTION

The enamel of this invention is made from an epoxy resin which must be a cycloaliphatic epoxy resin. The cycloaliphatic epoxy resin is a totally saturated cyclic compound having at least two epoxy groups with the two carbon atoms in the epoxy group forming part of a larger ring structure. The cycloaliphatic epoxy preferably has exactly two epoxy groups. Mixtures of cycloaliphatic epoxies may also be used. A preferred mixture is bis(3,4-epoxycyclohexyl) adipate and 3,4-epoxy cyclohexylmethyl-3,4-epoxycyclohexane carboxylate in a weight ratio of about 1:2 to about 4:1. If less of the bis(3,4-epoxycyclohexyl) adipate is used the coating may be brittle and if more of that compound is used, the enamel is more expensive to produce.

The enamel also contains an ultraviolet curative. This is a compound which generates a cation in the presence of UV light. The cation then cures the epoxy resin. As little of the UV curative as will work should be used as more is unnecessary and the UV curative is usually expensive. Typically, at least about 0.1% by weight based on total solids of the UV curative will be needed. UV curatives are commercial and proprietary compounds which are usually sold in a polyol such as triethylene glycol. A detailed description of many suitable UV curatives can be found in U.S. Pat. No. 4,090,936, herein incorporated by reference.

The enamel composition of this invention also preferably contains up to about 35% by weight based on total solids of a modifying resin. If more than about 35% modifying resin is used, the properties of the enamel may deteriorate. Preferably, the percentage of modifying resin is about 20 to about 30%. The modifying resin must be co-reactive with the cycloaliphatic epoxy and must not char when soldered or prevent the UV cure. The modifying resins which are preferred are polyvinyl formal, solid cycloaliphatic epoxies, and a low molecular weight polyester. Additional details of the preparation of a low molecular weight polyester modifying resin may be found in the examples.

The enamel may also contain up to about 1% by weight based on total solids of a surface active agent to smooth the surface of the coating. Fluorocarbons and other types of commercial compounds are used as surface active agents. However, the enamel preferably does not contain a surface active agent because it is usually unnecessary.

Other than the small amount of solvent that is included with the UV curative, the enamel should not contain any non-reactive solvents. Also, with the exception of the polyester modifying resin, the enamel should not contain any compound having an unshared pair of electrons, that is, a Lewis base, because such compounds can ruin the UV cure by grabbing the cations produced by the action of actinic radiation on the curative. Such compounds include those containing acids, anhydrides, amine, amide or urethane groups.

In preparing the enamel composition, no particular order of mixing is required. The composition can be applied to any type of wire including copper and aluminum of any size or shape including round and rectangular. The wire is preferably cleaned prior to coating. After the wire passes through the composition, excess enamel composition is preferably removed by means of a metering die. Rollers or a felt applicator could also be used to remove excess composition. The coated wire then passes between a bank of ultraviolet lights of sufficient intensity to cure the resin. Coating speeds of up to about 100 feet per minute or more can be obtained depending upon the intensity and number of ultraviolet lights available.

The following examples further illustrate this invention.

EXAMPLE 1

A mixture of 60 grams 3-4-epoxycyclohexyl methyl-3,4 epoxycyclohexane carboxylate sold by Union Carbide under the designation "ERL 4221" and 5 grams of the diglycidyl ether of neopentoglycol (DGENPG, used as a modifying resin) were heated to about 85° while stirring. Heating was necessary in order to dissolve 20 grams of a solid cycloaliphatic sold by Union Carbide under the designation "ERRA 4211" which was added to the mixture. The mixture was then cooled to room temperature. 15 grams of the total mixture was then thoroughly mixed with 5 grams of a UV curative sold by 3M Company under the designation "FC 505." The mixture was then applied to 18 AWG copper wire and cured with UV radiation. The enamel film was smooth and flexible and soldered at 450° C. in less than 4 seconds without charring.

EXAMPLE 2

Part 1—186 grams ERL 4221 was heated to 85° to 90° C. and 7 grams polyvinyl formal sold by Monsanto under the designation Formvar 15/95E was slowly added. The mixture was stirred until its clear solution was achieved.

Part 2—190 grams bis (3,4-epoxy cyclohexyl) adipate sold by Union Carbide under the designation "ERL 4299" was heated to 85°to 90° C. and 7 grams of Formvar 15/95U was slowly added. The mixture was stirred until a clear solution was achieved. A thorough blend of 50 grams, Part 2, 30 grams, Part 1, and 12 grams of UV cured and sold by 3M Company under the designation "FC 507" was made. This blend was applied to 18 AWG copper wire and was cured with UV radiation. The enamel film was smooth and flexible and soldered to 450° C. in less than 4 seconds without charring.

EXAMPLE 3

Into a 3 neck flask equipped with a stirrer, thermometer and steam condenser was charged: 266.4 grams phthalic anhydride, 25.8 grams triethylene glycol, 123.2 grams ethylene glycol, and 88.45 grams glycerol. The ingredients were rapidly heated to 106° C. and then to 230° C. at 15° C. per hour. The reaction was held at 230° C. until an acid number of 8 was achieved. Reaction was then stopped and quickly cooled to approximately 100° C. when 1013.2 grams ERL 4299 and 548.7 grams ERL4221 was added. The reaction was further cooled to room temperature and 95.1 grams of a UV curative sold by 3M Company under the designation FC 508 was added. This resin was coated on 21 AWG copper wire and was cured with UV radiation in an Ashdee tower. The enamel film was smooth and flexible and soldered to 450° C. in 4 seconds or less without charring.

EXAMPLE 4

Into a 3 neck flask equipped with a thermometer, stirrer, and steam condenser was charged: 266.4 grams phthalic anhydride, 262.8 grams adipic acid, 51.6 grams triethylene glycol, 246.4 grams ethylene glycol, and 176.9 grams glycerol. Ingredients were rapidly heated to 160° C. and then to 230° C. at 15° C. per hour. The reaction was held at 230° C. until an acid number of 8 was achieved. Reaction was then stopped and quickly cooled to less than 100° C. and 248 grams of ERL 4299 and 124 grams of ERL 4221 was added. A blend of 31 grams of that mixture, 43 grams of ERL 4299, 22 grams of ERL 4221 and 4 grams of FC 508 were thoroughly mixed. This resin was coated on 21 AWG copper wire and cured with UV radiation in the Ashdee Tower. The enamel film was smooth and flexible and soldered to 450° C. in 4 seconds or less without charring.

EXAMPLE 5

Into a three necked flask equipped with a stirrer, thermometer, and an air condenser was charged 201 gram trimethylol propane, 138 grams glycerol, 166.5 grams phthalic anhydride, and 164.3 grams adipic acid. The ingredients were heated rapidly to 106° C. and then to 230° C. at 15° C. per hour. The reaction was held at 230° C. until an acid number of 8 was achieved. The reaction was then stopped and cooled to approximately 100° C. and 102 grams of ERL 4299 and 51 grams of ERL 4221 was added. A blend of 11.25 grams of that mixture, 19.5 grams ERL 4221, 39.75 grams of ERL 4299 and 4.5 grams of FC 508 were thoroughly mixed. The blend was coated on 21 AWG copper wire and cured with UV radiation. The enamel film was smooth and fairly flexible and soldered to 450° C. in less than 4 seconds without charring.

I claim:

1. An insulated magnet wire comprising an elongated conductor coated with a UV cured solventless composition which does not char but melts away from solder when exposed thereto and which comprised prior to curing:
   (1) a totally saturated compound having at least two rings each containing an epoxy group:

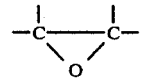

(2) up to 35% by weight based on total solids of 3,4-epoxycyclohexylmethyl- 3,4-epoxycyclohexane carboxylate; and
   (3) a UV curative which generates a cation in the presence of UV light.

2. A method of joining a piece of insulated magnet wire to a conductor comprising contacting said juxtaposed piece and conductor with molten solder, and permitting said molten solder to solidify, where said insulated magnet wire comprises an elongated conductor coated with a UV cured solventless composition derived from the cure of a composition comprising:
   (1) a totally saturated compound having at least two rings each containing an epoxy group:

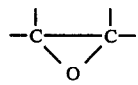

(2) up to 35% by weight based on total solids of a modifying resin which is co-reactive with said totally saturated compound, and which does not char or prevent UV cure; and (3) a UV curative which generates a cation in the presence of UV light.

3. A method according to claim 2 wherein said modifying resin is about 20 to about 30% by weight of said enamel based on total solids.

4. A method according to claim 2 wherein said modifying resin is 3,4-epoxycyclohexylmethyl-3,4-epoxycyclohexane carboxylate.

5. A method according to claim 2 wherein said modifying resin is polyvinyl formal.

6. A method according to claim 2 wherein said modifying resin is a low molecular weight polyester.

7. A method according to claim 2 wherein said totally saturated compound is a mixture of bis (3,4-epoxycyclohexyl) adipate and 3,4-epoxycyclohexylmethyl- 3,4-epoxycyclohexane carboxylate in a weight ratio of about 1 to 2 to about 4 to 1.

8. A method according to claim 2 wherein the amount of UV curative is at least about 0.1% by weight.

9. A method according to claim 2 wherein said conductor is copper.

* * * * *